(12) United States Patent
Essling

(10) Patent No.: US 10,670,398 B2
(45) Date of Patent: Jun. 2, 2020

(54) POSITION-SENSITIVE OPTOELECTRONIC DETECTOR ARRANGEMENT, AND LASER BEAM RECEIVER USING SAME COMPRISING AT LEAST TWO WEIGHTING NETWORKS WITH NETWORK NODES RESPECTIVELY CONNECTED VIA A PHOTODIODE

(71) Applicant: AndroTec GmbH, Waldfischbach-Burgalben (DE)

(72) Inventor: Mirko Essling, Kellenbach (DE)

(73) Assignee: ANDROTEC GMBH, Waldfischbach-Burgalben (DE)

( * ) Notice: Subject to any disclaimer, the term of this patent is extended or adjusted under 35 U.S.C. 154(b) by 167 days.

(21) Appl. No.: 15/759,795

(22) PCT Filed: Sep. 13, 2016

(86) PCT No.: PCT/EP2016/071562
§ 371 (c)(1),
(2) Date: Mar. 13, 2018

(87) PCT Pub. No.: WO2017/042399
PCT Pub. Date: Mar. 16, 2017

(65) Prior Publication Data
US 2018/0259332 A1 Sep. 13, 2018

(30) Foreign Application Priority Data
Sep. 13, 2015 (DE) .................. 10 2015 011 934

(51) Int. Cl.
*G01J 1/42* (2006.01)
*G01C 15/00* (2006.01)

(52) U.S. Cl.
CPC .......... *G01C 15/006* (2013.01); *G01J 1/4228* (2013.01)

(58) Field of Classification Search
CPC ....... G01C 15/006; G01C 3/08; G01J 1/4228; G01J 1/42; G01J 2001/446; G01B 11/14
(Continued)

(56) References Cited

U.S. PATENT DOCUMENTS 5,869,834 A    2/1999  Wipenmyr
6,873,413 B2*  3/2005  Douglas .............. G01C 15/006
                                                356/399
(Continued)

FOREIGN PATENT DOCUMENTS

DE   10 2013 019 532 A1   5/2015
WO      02/090883         11/2002
WO     2014/056480 A1     4/2014

OTHER PUBLICATIONS

Huai-Dong Ding, et al.; Multi-Resolution Image Position Sensing Characteristics of R-HPSD; Journal of Robotics and Mechatronics, 5(2):122-129, 1993.
(Continued)

*Primary Examiner* — Que Tan Le
(74) *Attorney, Agent, or Firm* — Kilpatrick Townsend & Stockton LLP

(57) ABSTRACT

Position-sensitive light beam detector comprising photodiodes and at least two weighting networks, each of which includes a signal output and network nodes. According to the invention, a plurality of the network nodes of the first weighting network is provided for the photodiode terminal in such a way that each node of said plurality of nodes is connected to a node of the second weighting network via a photodiode.

20 Claims, 7 Drawing Sheets

(58) Field of Classification Search
USPC .......................................... 250/214 R, 221
See application file for complete search history.

(56) References Cited

U.S. PATENT DOCUMENTS

| | | |
|---|---|---|
| 7,019,278 B2 | 3/2006 | Douglas |
| 7,394,527 B2 | 7/2008 | Essling |
| 7,724,352 B2 | 5/2010 | Essling |
| 9,121,695 B2 | 9/2015 | Dumoulin |
| 2006/0049339 A1 | 3/2006 | Green et al. |
| 2014/0203172 A1 | 7/2014 | Munroe et al. |

OTHER PUBLICATIONS

Goran P. Petersson, et al.; Position Sensitive Light Detectors with High Linearity; IEEE Journal of Solid State Circuit, SC13(3):392, 1978.
International Search Report dated Apr. 10, 2017 for PCT/EP2016/071562, 3 pgs.
Zurcher et al., "Elektronick-und Messtechniklabo, Messbrucken", retrieved from internet on Nov. 16, 2016: https://home.zhaw.ch/~spma/Scripts/Diverse EL Themen/Messbruecken.pdf, Feb. 2000, 12 pages (6 pages German language and 6 pages of machine translation).

* cited by examiner

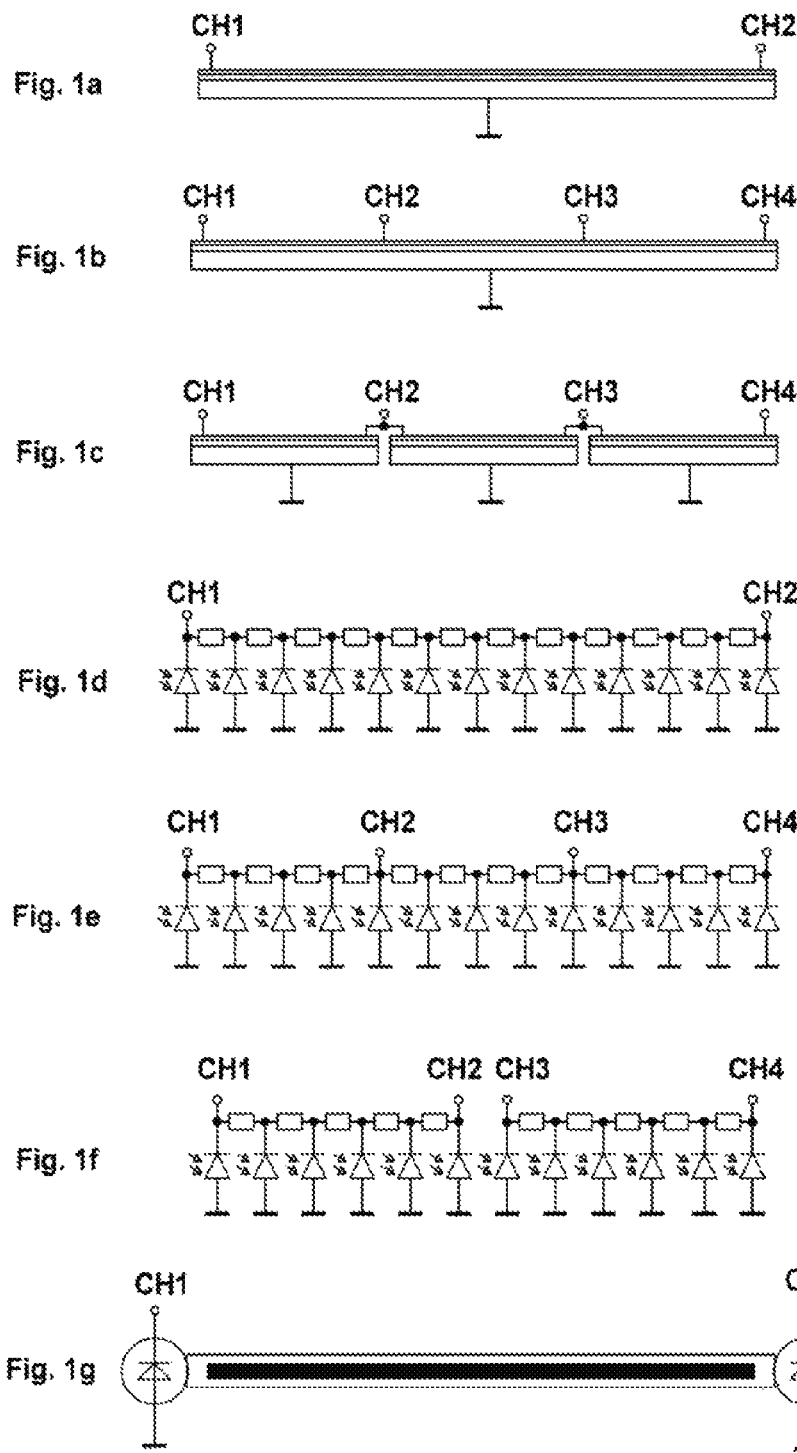
(Prior Art)

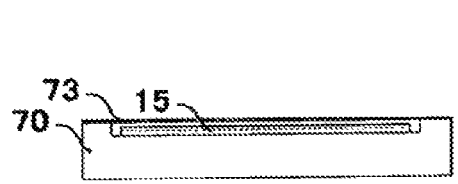
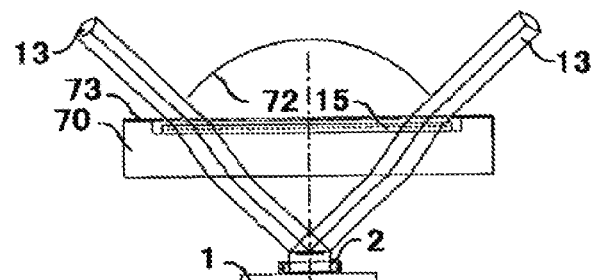
Fig. 10a          Fig. 10b
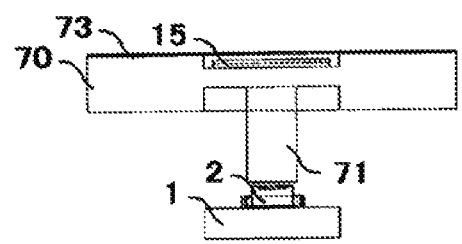
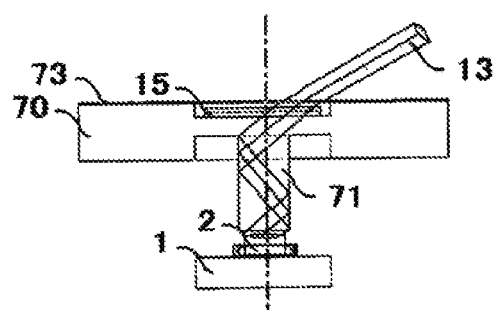
Fig. 10c          Fig. 10d
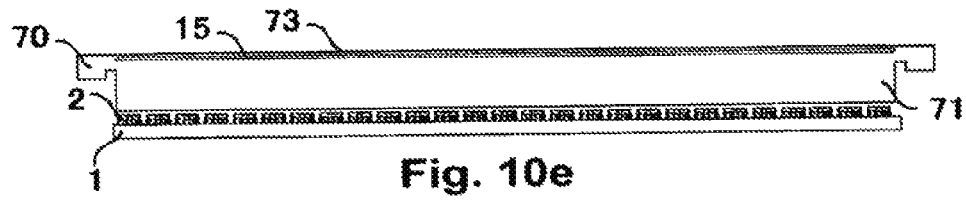
Fig. 10e
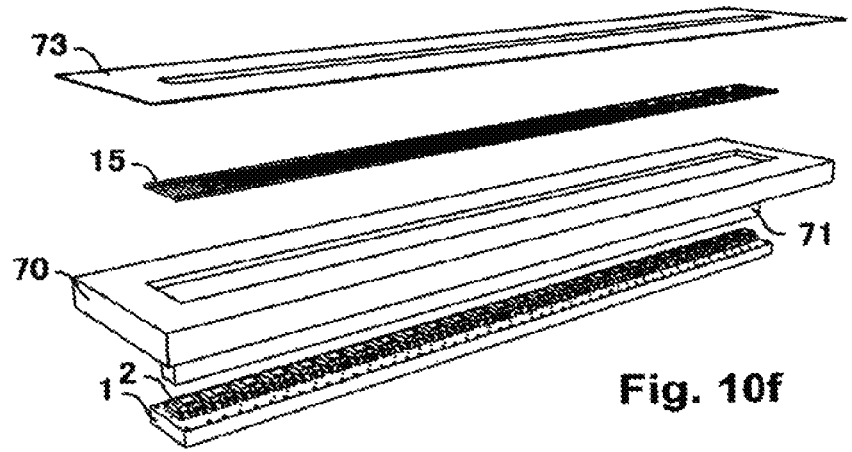
Fig. 10f

POSITION-SENSITIVE OPTOELECTRONIC DETECTOR ARRANGEMENT, AND LASER BEAM RECEIVER USING SAME COMPRISING AT LEAST TWO WEIGHTING NETWORKS WITH NETWORK NODES RESPECTIVELY CONNECTED VIA A PHOTODIODE

CROSS-REFERENCES TO RELATED APPLICATIONS

This application is a National Stage of International Application No. PCT/EP2016/071562, filed Sep. 13, 2016, which claims the benefit of German patent application no. 10 2015 011 934.6, filed 13 Sep. 2015. The contents of these applications are hereby incorporated by reference in their entireties for all purposes.

BACKGROUND

The present invention relates to what is claimed in preambles and is concerned with a position sensitive optoelectronic detector arrangement for the spatial resolution of light beam reception.

Position sensitive optoelectronic detector arrangements are already employed in diverse fields nowadays.

Almost synonymous with this term are lateral effect photodiodes (therefore often also called position sensitive diode/device or PSD for short), which have been part of the prior art for many years. These components consist of a very simple structure of a light sensitive PIN semiconductor diode chip having a resistance layer, which can be used to divide the photocurrent laterally between two (1D PSD) or four (2D-PSD) electrodes at the edge of the chip, depending on the point of incidence of a preferably point light beam. From the ratio of the currents of said electrodes, relatively independently of the signal strength of the light point, the position thereof on the chip can then be deduced. Examples of a 2D PSD are found in (G. P. Petersson and L. E. Lindholm. Position sensitive detector with high linearity. IEEE Journal of Solid State Circuit, SC13(3):392, 1978). An example of a 1D PSD is found in U.S. Pat. No. 5,869,834. Such a 1D PSD is also shown in FIG. 1a (prior art).

Such PSDs are employed e.g. in conjunction with optical lens systems for the non-contact optical determination of a distance to an object by means of laser triangulation or with direct irradiation for high precision alignment of machine beds by means of laser guide beams, etc.

The major advantage of the lateral effect photodiodes stems from the fact that, under optimum boundary conditions and in expedient applications, in some instances extremely high spatial resolutions right down to the μm range can be achieved. The absolute accuracy is considerably poorer, in particular also because the positional accuracy is often dominated by the evaluation electronics connected thereto, the drift effects thereof or extraneous light.

Owing to the usually high sheet resistances, however, such sensors become saturated very early despite biasing with relatively high voltages and are therefore suitable only to a limited extent for being used in direct sunlight without fairly substantial optical filter measures, such as e.g. narrowband dielectric optical bandpass filters.

In order to minimize this problem and in order to further increase the resolution, one dimensional PSDs have been proposed which provide more than two electrodes as taps of the resistance area, which are preferably arranged equidistantly over the detector length. As a result, it is possible, for example, by using four instead of two electrodes, to reduce by a factor of three the internal voltage drops as a result of DC light components at the resistance layer and thus to triple the saturation limit for the same bias voltage. Such an arrangement was proposed in (Huai-Dong Ding and M. Idesawa. Multi-Resolution Image Position Sensing Characteristics of R-HPSD. Journal of Robotics and Mechatronics, 5(2):122-129, 1993) and is illustrated symbolically in FIG. 1b (prior art).

Where laser beams are used for measurement, laser beam receivers are necessary. One typical field of use is for example the reception of laser light from the rotary and linear lasers used on construction sites, in industrial applications and the like. Said lasers emit laser light, for example as a rotating or otherwise moved beam that is punctiform in cross section, as a modulated laser fan that may be spatially static or moved, or as a modulated laser plane that may be fanned out by means of conical mirrors. In order that this radiation can still be used for measurement even at great distances and under unfavorable conditions, special laser beam receivers are needed which take account of the pulse shape of the received light pulses and can differentiate the latter from the ambient light and optical disturbance influences.

Laser beam receivers are often embodied as so called manual receivers for leveling and aligning purposes, sometimes also as machine receivers for fitting to the arms or plates of construction machines for remote display or the automatic control of the position of processing tools e.g. when leveling road surfaces.

What all these laser beam receivers have in common is that they have a linear one dimensionally spatially resolving position sensitive optoelectronic detector arrangement of greater or lesser length which makes it possible to determine the point of incidence of the laser plane or the like thereon and thus to determine and display the position of the laser light receiver in relation to said laser plane in at least one dimension.

Detector arrangements having a length of 50 . . . 120 mm are typically employed in the case of manual receivers, whereas lengths of 120 . . . 1000 mm typically predominate in the case of machine receivers.

Since with traditional lateral effect photodiodes it is largely impossible to fabricate such lengths of the detector arrangements from a single monolithic semiconductor chip, this type of detector arrangement has not found direct commercial application in the case of the laser beam receivers described above.

Rather, in the past attempts have been made, inter alia, to realize alternative position sensitive electro optical detector arrangements which more or less adopt the positive properties of the traditional PSDs by approximating the characteristic thereof by linear arrangements of individual photodiodes and the position dependent bulk resistances thereof by weighting networks, usually chains of e.g. resistances, inductances or resonant circuits. The electrodes of the traditional PSD are then replaced by the ends of the chains and the weighting of the position of the individual photodiode elements is realized by the connection thereof to the corresponding taps (nodes) of the weighting networks. In the literature such arrangements are often referred to as discrete PSD (or D PSD for short), since the position characteristic thereof proves not to be continuous, but rather in discrete steps for very thin light beams, but transitions to quasi continuous profiles for wider beam diameters.

One example thereof is described in (Huai-Dong DING, M. IDESAWA and S. MATSUMOTO. A Comb-Structured PSD and Its Image Position Sensing Characteristics. Journal of the Society of Instrument and Control Engineers, 30(8): 883-891, 1994) and is shown in FIG. 1d (prior art) of the present application.

A further discrete PSD was described in (U.S. Pat. No. 7,019,278). Here some of the positive properties from FIG. 1b are transferred into a discrete PSD. The use of more than two taps (output signals) at the weighting networks here likewise has the advantage that voltage drops at the weighting networks as a result of DC light are minimized and that, in the case of more than two taps, it is possible to differentiate between thin beams (useful signal) and rather planar illumination, e.g. as a result of lightning pulses (interference signals).

A further D-PSD was proposed in US 2014/0203172 and is shown in FIG. 1e (prior art). Here two or more D PSDs are arranged in a line. The advantages largely correspond to those in U.S. Pat. No. 7,019,278, but with a disadvantage that a larger number of taps is required and that a continuous transition in the position characteristic between the two D PSDs ranges from difficult to impossible to realize.

A different path was taken in U.S. Pat. No. 9,121,695. This approach is shown symbolically in FIG. 1c. It can be discerned therein that this virtually involves a traditional PSD in accordance with FIG. 1b which has virtually been divided into smaller parts, with the latter being connected again at the adjacent electrodes (multi PSD). What is advantageous over traditional approaches is that this arrangement can consist of a plurality of relatively small PSD chips, which are simpler and thus less expensive to produce and thus also allow detector arrangements of any desired length. For the same properties, however, this arrangement is still very expensive in comparison with other approaches, without having genuine advantages.

All the approaches described up to this point (traditional PSD, D-PSD, Multi-PSD, FIG. 1a to FIG. 10 from the prior art share a common considerable disadvantage by which their applicability to AC applications (pulsed or modulated light beams, pulsed detection events, etc.) in the field of the laser beam receivers mentioned above is made considerably more difficult and their design for applications with high accuracy is made very expensive. The disadvantage can be seen in the fact that the taps of these detector arrangements are electrically connected by the bulk resistances or impedances of the weighting networks and in conjunction with the electrical termination and the junction capacitances of the detector elements over the length of the sensor produce frequency dependent phase shifts and/or frequency dependent amplifications and/or decreases of the position characteristic of the detector arrangement which are in turn still dependent on the temperature. An optimum termination of the taps (outputs) of the detector arrangements by the circuit parts (amplifier stages) connected downstream is ascribed a critical characteristic here since a fluctuation vis à vis temperature or frequency of just a few percent can make a precise position determination impossible. A further disadvantage stems from the fact that the termination impedance of these output signals usually also has to take up the DC currents as a result of DC light. In this case, inductances or their electronic equivalents (NIC, gyrator, etc.) have to be designed such that a fluctuation of the DC current within customary limits (darkness up to full insolation) does not cause an appreciable change in the position characteristic.

High accuracies of the position determination are very difficult to realize here with reasonable costs/low complexity, that is to say that applications with AC light signals such as e.g. the laser light receivers described above can be realized only in a comparatively costly manner.

A different path, one which completely avoids this weighty disadvantage of the stringent requirements made of the termination stages connected downstream, is taken by the optical waveguide PSD disclosed in U.S. Pat. No. 7,394,527 in the name of the applicant (in FIG. 1g therein), since here the position dependent weighting is realized with optical means (optical waveguide with scattering means) and frequency dependent crosstalk between the electrical output signals is virtually completely precluded. However, this approach is also beset by disadvantages. These consist, inter alia, in a wavelength dependence of the position characteristic, which may be up to 2% of the measured position in various commercially conventional laser light sources, and in comparatively high measurement value noise as a result of undesirably inefficient coupling in of the light and a highly position dependent measurement accuracy in conjunction with large light beam diameters, caused by the inherent, tan h( ) position characteristic.

Therefore, a position sensitive optoelectronic detector arrangement which enables high performance but at the same time can be realized cost effectively and which avoids the abovementioned disadvantages of the detector arrangements from the prior art and, when integrated into a laser light receiver, provides for a good cost/performance ratio would be desirable.

Thus, in particular for cost reasons, and for favorable measurement value noise under insolation, it would be desirable to provide a discrete position sensitive optoelectronic detector arrangement.

It would be desirable, in particular, to provide a position sensitive optoelectronic detector arrangement in which the frequency dependent crosstalk between the taps (signal outputs) is largely avoided per se in a wide useful frequency range.

It would also be desirable for the position sensitive optoelectronic detector arrangement not to impose any special requirements in respect of the AC termination of the signal outputs.

It would also be desirable for the position sensitive optoelectronic detector arrangement not to impose any requirements in respect of whether the output signals are processed further as currents or voltages and for the DC currents to be able to be conducted away via separately supplied bias voltages without additional outlay.

It would be desirable, in particular, for the position sensitive optoelectronic detector arrangement to ensure a very good linearity even for very thin light beam profiles and, with large beam profile diameters, not to yield any additional measurement errors over and above the customary secondary problems.

It would likewise be desirable for the position characteristic of the position sensitive optoelectronic detector arrangement to be free of influences of the light wavelength to the greatest possible extent within customary limits of the application.

BRIEF SUMMARY

The problem addressed by the present invention consists in specifically a position sensitive optoelectronic detector arrangement which wholly or partly satisfies at least some of the desires mentioned above.

The solution to said problem is claimed in independent form. Preferred embodiments are found in the dependent claims.

What is thus proposed is a position-sensitive light beam detector comprising photodiodes and at least two weighting network, each comprising at least one signal output and network nodes, wherein provision is made for a plurality of the network nodes of the first weighting network to be provided for the photodiode terminal in such a way that each of said nodes is connected to one of the nodes of the second weighting network via a photodiode.

This makes use of the fact that photodiodes comprise at least one anode and one cathode and the electrical signal currents in anode and cathode are always identical in terms of magnitude, but differ in terms of sign. Accordingly, if a photodiode element of this detector arrangement is present at two different weighting networks—which is the case if it lies between the latter—then the output signals of the weighting network that are brought about on account of light beam reception (e.g. upon reception of a light pulse) never have the same polarity, but rather always have opposite polarities (provided that one of the out-put signals is not zero because the weighting zero is assigned to a specific photodiode).

What is alternatively proposed is also a position sensitive optoelectronic detector arrangement for the spatial resolution of light beam reception consisting of at least one spatially substantially linear arrangement of a multiplicity of photodiodes, at least two electrical weighting networks which are connected thereto and which are configured for different electrical weighting of the signals of individual photodiodes in accordance with their position along the linear arrangement on the detector arrangement, and at least two output signals of the detector arrangement, wherein each weighting network is connected to exactly one of the output signals and wherein the output signals that are adjacent in accordance with spatial weighting, upon light beam reception of the photodiodes jointly assigned thereto, have signal polarities respectively opposite to one another.

It should particularly be pointed out that the one dimensional position sensitive optoelectronic detector arrangements from the prior art described here, in particular the arrangements shown in FIG. 1a to FIG. 1f, always relate their output signals exclusively to either the cathodes or the anodes of their detector elements.

In particular, the prior art does not disclose how and whether the weighting is actually possible if only one signal output in each case is connected to a weighting network, that is to say that at least two weighting networks are provided which are not directly connected to one another.

Furthermore, a position-sensitive light beam detector is proposed as advantageous, wherein it is furthermore provided that only cathodes of the photodiodes are connected to the nodes for the photodiode terminal of the first weighting network, and only anodes of the photodiodes are connected to the nodes for the photodiode terminal of the second weighting network. This is clearly advantageous for simplification of the evaluation and al-so upon simultaneous reception of an expanded light beam on a plurality of photodiodes alongside one another.

It is thus advantageous if it is ensured that the detector arrangement according to the invention is distinguished by the fact that for a plurality of the photodiodes, preferably for all of the photodiodes, both the cathode currents thereof and the anode currents thereof are used for spatial weighting in different weighting networks, or that at least at two of the weighting networks either only cathodes or anodes of the photodiodes assigned thereto are connected thereto.

In the latter case, it is ensured to a particularly great extent that the signals at the outputs of the weighting networks do not mutually influence one another, since only reverse biased and/or slightly forward biased photodiode depletion layers are situated between the weighting networks, the impedances of said layers thus usually being in non disturbing, high value ranges (usually many millions of ohms). This is virtually insignificant when the weighting networks are designed at an impedance level of e.g. below 1 kohm.

Accordingly, a position-sensitive light beam detector is also furthermore proposed as advantageous, wherein provision is made for at least one of the weighting networks to be formed as a chain, wherein the signal output is arranged at one end of the chain and a bias voltage is connected to the other end of the chain.

Furthermore, a position-sensitive light beam detector is proposed as advantageous, wherein provision is furthermore made for weighting networks to be formed as a chain of electrical resistances or as a chain of inductances or as a chain of resonant circuits.

A further preferred variant accordingly provides, inter alia, for the weighting networks to consist of chains of either electrical resistances, inductances or resonant circuits tuned to a specific modulation frequency of the light source. In all these cases, a bias voltage source can be connected to one point of the chain, preferably to one end thereof, via which bias voltage source the DC signal currents of all the connected photodiodes can flow back, but which bias voltage source is designed with sufficiently low resistance in order that no appreciable crosstalk of the outputs of identical polarity that are connected thereto via the weighting networks should be expected.

It should be mentioned at the same time that it is proposed as advantageous if the nodes for the photodiode terminal are arranged between the resistances, inductances or resonant circuits of the chain. This results in a very simple arrangement.

However, it should furthermore be mentioned that according to the invention the weighting networks need not necessarily all contain the same topology, that they need not all contain the same number of individual elements, that they need not all contain the same individual elements or individual elements of identical type, that not all of the individual elements need be identical to one another (that is to say, for example, that different R values in a weighting network are possible), that not all of the individual elements need be of identical type (a network can contain e.g. R and also L and also RC individual elements) and that a photodiode also need not be connected to each node of a weighting network.

Moreover, not all of the photodiodes of a position-sensitive light beam detector need be connected to two weighting networks as proposed. Accordingly, embodiments can occur, in particular, in which photodiodes are not connected to all of the nodes of a weighting network that are provided for photodiode connection such that said photodiodes are connected to a node of a different network at their respective other end.

Furthermore, a position-sensitive light beam detector is proposed as advantageous, wherein the weighting networks are embodied as chains of electrical resistances, wherein provision is then preferably made for the resistances in the chain to have identical setpoint resistance values; this facilitates the evaluation, specifically even moreover if the actual resistance values—as usual—vary somewhat in a manner governed by tolerances. In this case, for extensive beams the tolerances are even rather non critical because tolerances average out here.

Furthermore, a position-sensitive light beam detector is proposed as advantageous, wherein provision is made for the at least two weighting networks to be each embodied as a chain, wherein the signal output is arranged at one end of each chain and a bias voltage is con-nected to the other end of each chain, and wherein different bias voltages (Vaa, Vcc) are connected to the first and second weighting network.

Furthermore, a position-sensitive light beam detector is proposed as advantageous, wherein upon light beam reception a first signal polarity is present at the signal output of the first weighting network, said first signal polarity being opposite to that at the signal output of the second weighting network. This is readily possible by applying bias voltages.

Usually, all or at least the majority of the anodes of the photodiode elements lead into weighting networks which at one end are connected into a first, preferably rather more negative, bias voltage terminal ("common anode" or anode bias voltage Vaa).

Usually, all or at least the majority of the cathodes of the photodiode elements then also lead into weighting networks which at one end join a second, preferably rather more positive, bias voltage terminal, i.e. are connected thereto ("common cathode" or cathode bias voltage Vcc). In this case, the comparative "more positive" for Vcc relates to the potential Vaa. The potential Vcc is thus the more positive potential, and the potential Vaa is the "more negative" potential. The potentials Vaa and Vcc are then ergo different from one another.

It can thus be stated that the operating voltage is con-nected to the preferably two bias volt-age terminals present, via which the detector arrangement is supplied with the necessary operating current in order to prevent saturation of the photodiodes under the influence of DC light. The pho-todiodes are therefore preferably to be kept in the reverse direction in terms of voltage.

A special case that is not necessarily preferred, but is mentioned for the sake of complete-ness, is Vaa=Vcc, wherein the photodiodes are slightly forward biased under the influence of light. In this case, the weighting network should be designed with particularly low resistance in order to limit the influences of the forward currents.

A further preferred variant of the detector arrangement can also provide that, in the case of at least one weighting network, respectively either two anodes or two cathodes of photodiodes are connected to the internal nodes of the chain. This is advantageous if two photodiodes in said weighting network are accorded identical weights.

Moreover, a position-sensitive light beam detector is also proposed as advantageous, wherein provision is furthermore made for at least one third weighting network to be pro-vided, wherein at least the second of the at least three weighting networks is formed as a chain having internal nodes different than the signal output and a supply voltage input, wherein at least one of said internal nodes of the chain either the anodes or the cathodes of two different photo-diodes are connected, wherein the other pole of the first of said photodiodes is connected to a node of the first weighting networks and wherein the other pole of the second of said photodiodes is connected to a node of the third weighting network.

It is furthermore preferred for one of the output signals of the detector arrangement to be tapped off at a second end of the chain of the weighting network.

Furthermore, a position-sensitive light beam detector is proposed as advantageous, wherein the photodiodes are assigned a beam detection enhancement means for enhanc-ing the beam detection, which is preferably arranged such that it expands the light spot incident on the photodiodes with a given light beam diameter for simultaneous reception by at least two, preferably more, adjacent photodiodes.

Furthermore, a position-sensitive light beam detector is proposed as advantageous, wherein provision is furthermore made for the beam detection enhancement means to com-prise at least one lenticular film at the housing top side and a light guiding structure for guiding the light transmitted by the lenticular film down into the housing interior to the photodiodes. The lenticular film serves to expand an incident light beam, such that a plurality of photo-diodes are impinged on, and thus has the same effect as a light scattering means. The light guiding structure prevents beam portions that are incident at a shallow angle transversely with respect to the photodiode series from being lost and the sensitivity thus decreasing.

Furthermore, a position-sensitive light beam detector is proposed as advantageous, wherein provision is furthermore made for the beam detection enhancement means to com-prise a diffusing film in addition and/or as an alternative to the lenticular film.

Since this novel approach according to the invention constitutes a novel variant of a discrete PSD, it should be mentioned that the latter also benefits from a light scattering means which is provided at a distance from the receiving surface and which expands an incident beam at least in such a way that more than two photodiodes, which after all are typically arranged in a series alongside one another, are simultaneously impinged on at least somewhat. This type of beam expansion minimizes the discretization of the position characteristic in the case of a very thin beam diameter. Besides microlens arrays, holographic diffusers or other optical scattering means are also suitable as light scattering means. In this case, the lenticular films mentioned are regarded as microlens arrays having a particular lens shape.

Furthermore, a position-sensitive light beam detector is proposed as advantageous, wherein provision is made of a series of photodiodes alongside one another, the weighting networks are embodied as chains and the photodiodes arranged in a series are connected to nodes of the weighting network that succeed one another in the chain. In this case, the photodiodes preferably lie geometrically closely along-side one another, preferably in a manner adjoining one another. It is considered to be sufficient for the realization of this feature if at least some of those photodiodes of the light beam detector which form a specific chain are arranged such that at least some of the photodiodes arranged in a series are connected to the nodes of a weighting network that succeed one another in the chain. It is possible for a plurality of weighting networks to be provided alongside one another, e.g. with chains comprising 4 or 8 identical resistances, and for photodiodes that succeed one another in the series to be respectively connected thereto. It should be emphasized that it is advantageous, but not mandatory, for the series of successive photodiodes to be a series of directly adjacent photodiodes, that is to say for the series of successive photodiodes not to contain any photodiodes which are not connected to the same weighting network.

The application of the detector arrangement according to the invention is particularly preferred if the latter is inte-grated into a light beam receiver, that is to say in particular also the manual laser receivers or machine receivers for receiving construction lasers, said receivers being required on construction sites. In both applications, this detector arrangement optimizes the measurement accuracy and the production costs.

Also disclosed is a method for receiving a rotating laser beam sweeping over a plane, wherein provision is made for the simultaneously obtained cathode currents and anode cur-rents of the photodiodes connected to the different weighting networks to be evaluated in order to determine the position of beam reception.

Particular preference is likewise given to the use of this detector arrangement in conjunction with the following inventions in the name of the applicant: DE 11 2013 004 987 (combination laser receiver), DE 10 2013 019 532 (laser receiver with interference signal suppression), U.S. Pat. No. 7,394,527 (laser peak sampling) and U.S. Pat. No. 7,724,352 (alternative signal processing). The disclosure content of said documents shall in each case be incorporated by reference.

BRIEF DESCRIPTION OF THE DRAWINGS

The invention is described below merely by way of example with reference to the drawing, in which:

FIGS. 1a, 1b, 1c, 1d, 1e, 1f, and 1g illustrate various exemplary detector arrangements from the prior art;

Figure 4:
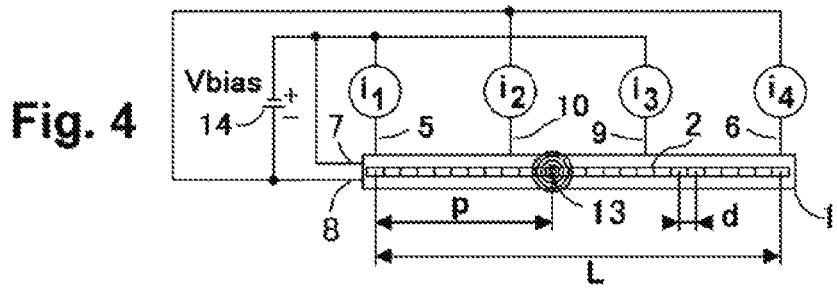
FIG. 4 illustrates a detector arrangement with the circuit from FIG. 3 and depicted light beam, bias voltage and output signals.
Figure 5A:
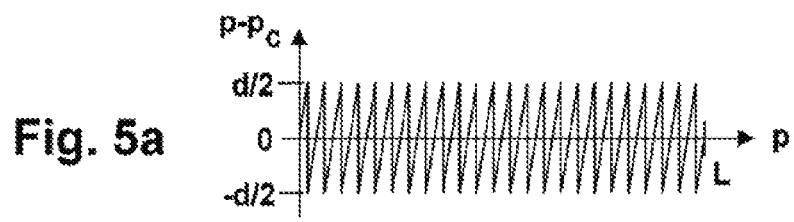
Figure 5B:
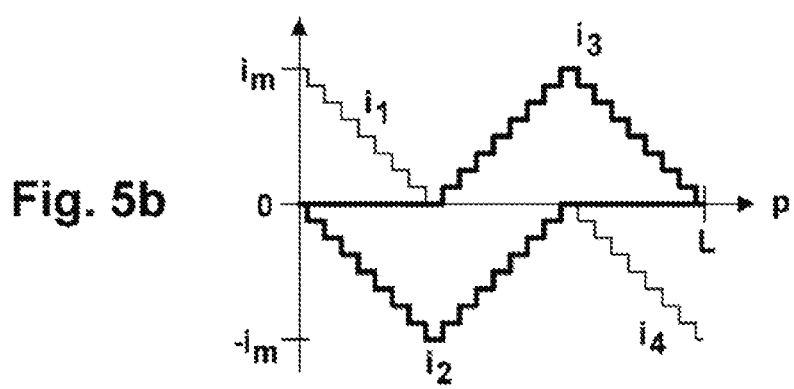
Figure 6A:
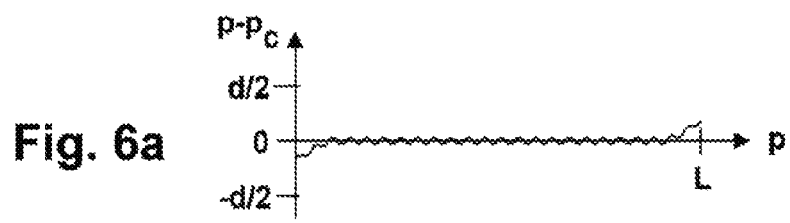
Figure 6B:
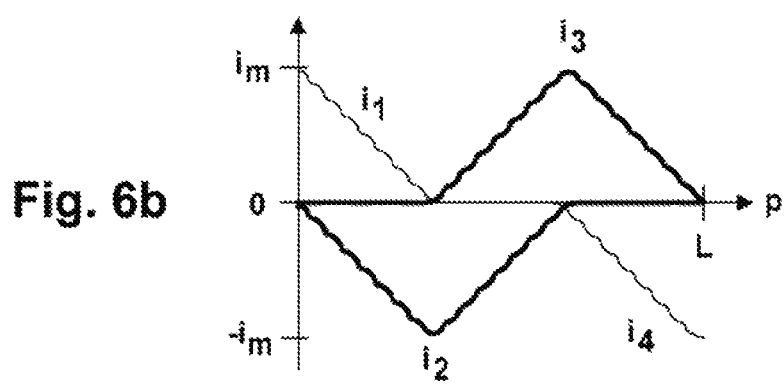
Figure 7:
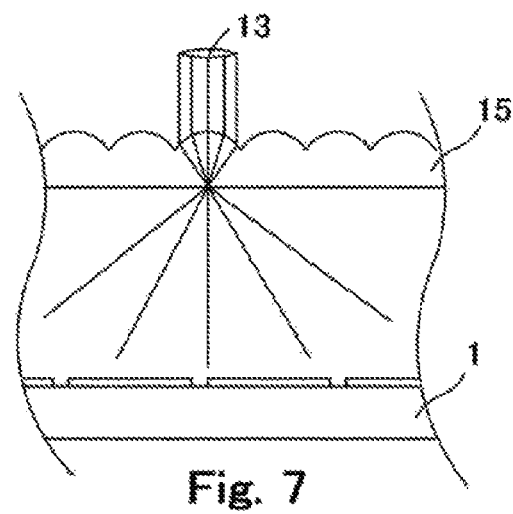
Figure 8:
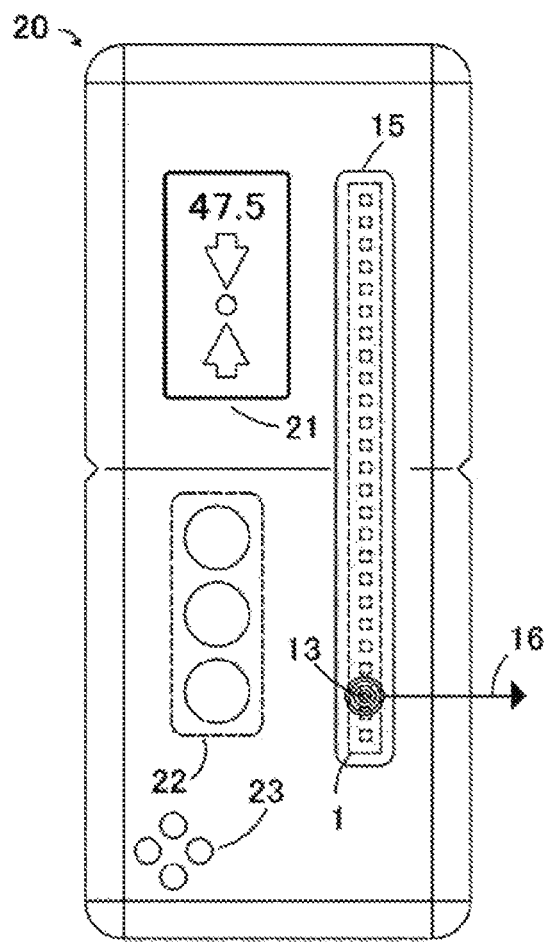
Figure 9:
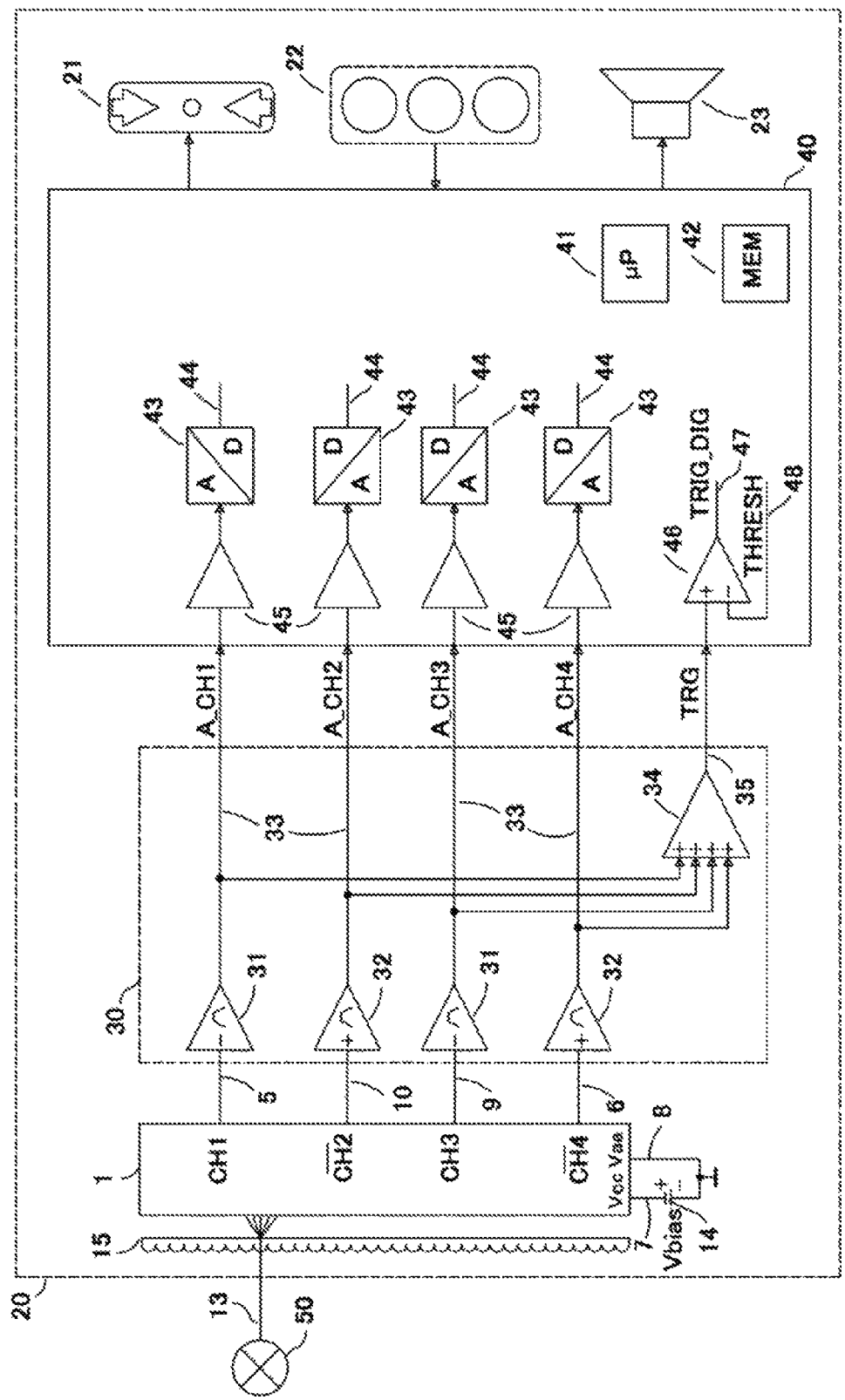

with respect to the detector arrangement in FIG. 4,

FIG. 5a illustrates linearity errors p pc obtained upon reception on the photodiodes of a light beam having a small beam diameter as a function of the real light beam position p along the length L of the series of photodiodes arranged alongside one another at the distance d;

FIG. 5b illustrates the profile of the currents i1, i2, i3, i4 detected at the weighting network outputs 5, 9, 10 and 6, respectively, idealized for a case in which the distances between the photodiode surfaces are zero and the beam has a vanishingly small diameter, wherein in view of the fact that four current curves are depicted in one common graphical illustration for reasons of clear illustration, in order to avoid lack of clarity it should be noted that
  i1 is depicted as a thin line,
    falls from the maximum value in steps to zero
    and then remains constant at zero;
  i2 is depicted with a thick line,
    falls from zero in steps to a minimum value,
    then rises in steps again to zero
    and then remains constant at zero;
  i3 is depicted with a thick line,
    is firstly constant at zero,
    then rises from zero in steps to a maximum value and then falls from said maximum value in steps again to zero;
  i4 is depicted with a thin line,
    is firstly constant at zero,
    and then falls from zero in steps to its minimum;

FIG. 6a and FIG. 6b correspond to FIG. 5a and FIG. 5b, respectively, but shows the corresponding curves for the reception of a light beam having a large beam diameter;

FIG. 7 illustrates a lateral excerpt from a detector arrangement according to the invention comprising diffusing means for improving the line-arity achievable with small beam profile diameters;

FIG. 8 illustrates a laser beam receiver that uses the detector arrangement from FIG. 4;

FIG. 9 illustrates a block diagram of the laser beam receiver from FIG. 8;

FIG. 10a illustrates a detector arrangement according to the prior art comprising known diffusing means spaced apart from the photodiodes (cf. e.g. Bosch receivers known from the prior art) from US 2014/0203172 A1;

FIG. 10b illustrates the detector arrangement according to the prior art from FIG. 10a with incident lateral beams and aperture angle;

FIG. 10c illustrates a detector arrangement according to the invention com-prising diffusing means and associated light guiding structure (prism) preferably to be used;

FIG. 10d illustrates a detector arrangement in accordance with FIG. 10c, with depicted laterally incident beam;

FIG. 10e illustrates a side view of a detector arrangement in accordance with an embodiment; and FIG. 10f illustrates a perspective, exploded view of a detector arrangement in accordance with an embodiment.

DETAILED DESCRIPTION

FIGS. 2a-2d shows four possible variants of the—designated generally by 1—position sensitive optoelectronic detection arrangement 1 or of the position-sensitive light beam detector 1 of the invention.

Figure 2A:
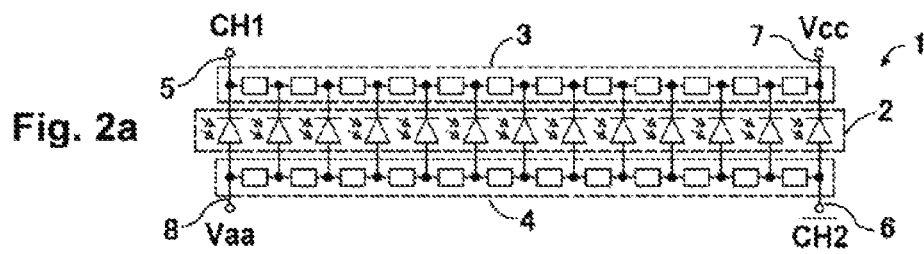
FIGS. 2a, 2b, 2c, and 2d illustrate four circuits of detector arrangements according to the invention.

FIG. 2a shows a particularly simple variant comprising two output signal outputs 5 and 6 at chain type weighting networks 3 and 4 assigned thereto, which weighting networks here as possible and preferred are constructed from resistances having resistance values identical to one another.

The resistance values within the chain can readily be chosen such that measurement value noise acceptable to an application, a power consumption that is not excessively high and a favorable saturation point in the case of DC light are obtained.

Thirteen photodiodes 2 are connected to the weighting networks. The weighting network 3 is related to the positive bias voltage Vcc, applied at reference numeral 7. If identical resistance values are taken as a basis, the weighting factors of the nodes of the chain in accordance with the technical current direction from left to right are:

13/13=1, 12/13, 11/13, . . . , 2/13, 1/13, 0/13=0.

For the weighting network 4 related to the negative bias voltage Vaa (fed in at reference numeral 8), the weighting factors of the nodes of the chain from left to right given once again identical resistance values are

−0/13=0, −1/13, −2/13, . . . , −11/13, −12/13, −13/13=−1.

These weighting networks are of simple construction and advantageous for comprehension. Although detector arrangements of any desired length can be realized with this topology, it is expedient and advantageous vis à vis measurement value noise, power consumption and saturation point in the case of DC light to make modifications.

Figure 2B:
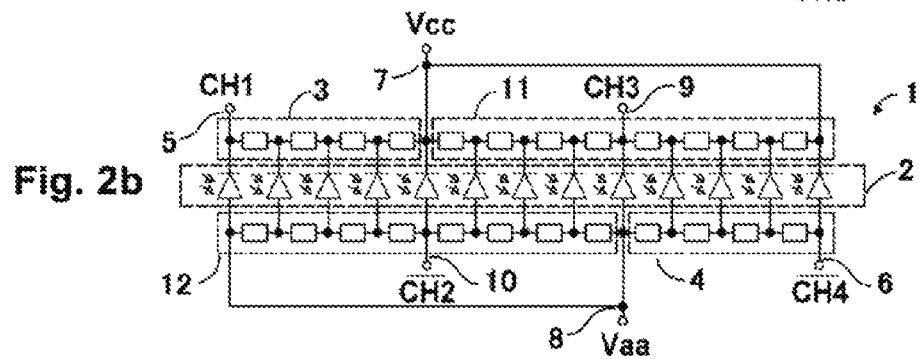

A detector arrangement derived directly from FIG. 2a can be seen in this respect in FIG. 2b; this involved merely connecting in pairs outputs 9 and 10 and at the opposite electrode of the photodiode at the output the appropriately matching bias voltage 8 and 7.

In other words, the anode of a further one of the photo-diodes shown in the series shown in FIG. 2b was additionally connected to the anode supply voltage Vaa. In other words, there are now two photodiodes present in the series, the anode of which is connected to the supply voltage, namely to the points 12 and 8. One of said photodiodes is arranged far from the edge of the series near toward the center; however, the photodiode exactly in the center of the series will not necessarily be involved, as shown by the example in FIG. 2 on the basis of a preferred embodiment. In the case of this photodiode arranged far from the edge, too, a signal output terminal, designated by 9/CH3, is provided on the weighting network to which the cathode side is connected.

Equally, in the case of another photodiode remote from the edge, the cathode is connected to Vcc and a signal terminal 10 is provided at the anode thereof at the opposite weighting network.

The structure thus formed can be understood either as a weighting network on the photo-diode anode side, which weighting network interacts with a weighting network on the photodiode cathode side, wherein with this mode of consideration each of the weighting network comprises respectively 12 resistances, respectively 2 input points for Vcc and Vaa and respectively 2 tapping points for the output signals (5, 9 and 10, 4 for CH1, CH3 and respectively CH2 and CH4), or else as a combination of a plurality of weighting networks, wherein a supply voltage is fed into each weighting network, a signal is obtained at the other end of each weighting network and either only photodiode anodes or only photodi-ode cathodes are connected to each of the weighting networks, such that the weighting networks are connected via photodiodes.

The arrangement is already advantageous with regard to measurement value noise, power consumption and saturation behavior in the case of DC light, but the arrangement from FIG. 2b can be simplified further.

This shall be explained on the basis of the mode of consideration according to which a continuous weighting network 12 is formed on the anode side of the photodiodes, and a weighting network 11 on the cathode side. In the case of this consideration, the weighting networks 11 and 12 for the photodiodes connected in series do not have weighs respectively falling and rising monotonically in one direction, but rather have a maximum and mini-mum, respectively, at one location. In this regard, the weighting factors in the case of the weighting network 11 from left to right are:
0/5=0, 1/5, 2/5, 4/5, 5/5=1, 4/5, 3/5, 2/5, 1/5, 0/5=0

In the case of the weighting network 12 they are, from left to right:
−0/5, −1/5, −2/5, −4/5, −5/5, −4/5, −3/5, −2/5, −1/5, −0/5

It is evident here that, apart from the weighting 5/5 and 5/5, respectively, all of the weights occur twice in these series. The simplification now proposed makes use of the possibility of simply leading photodiodes having an identical weighting to the same node and omitting the resistances that thus become free, i.e. are not required.

Figure 2C:
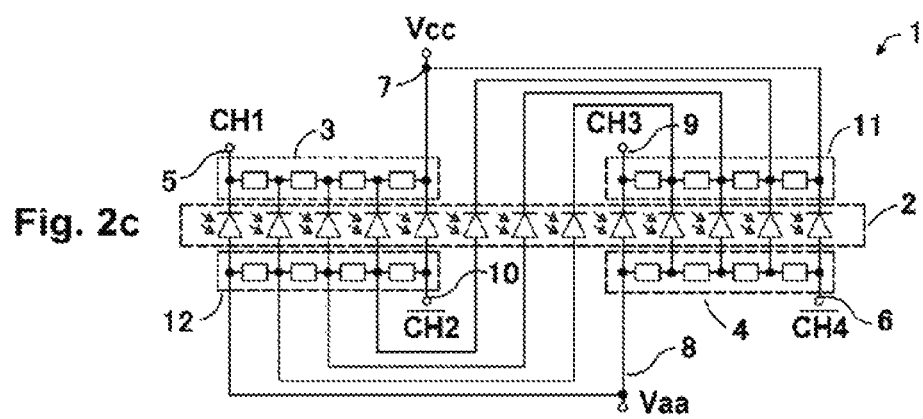

A simplified detector arrangement can be seen in FIG. 2c. The direct comparison between FIG. 2b and FIG. 2c shows how FIG. 2c is derived from the arrangement from FIG. 2b by the omission of specific resistances and the provision of specific lines.

This simplification results in an arrangement comprising weighting networks which are each smaller than those from FIG. 2a, the connections to the photodiodes being arranged differently and more terminals than in FIG. 2 being provided.

Figure 2D:
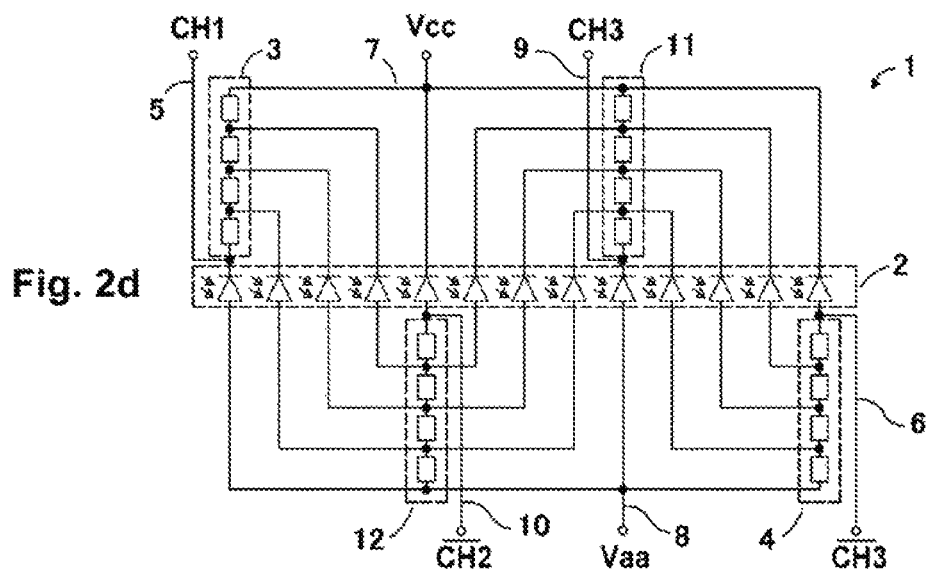

A detector arrangement that is topologically identical to FIG. 2c can be seen in FIG. 2d. For the sake of better understanding here the weighting networks have been arranged differently in order to make the simple arbitrary scalability of this arrangement more conspicuous.

A scaling is possible in various ways.

By way of example, a weighting network, an output and four further photodiodes can in each case be attached step by step on the left and/or on the right in order to thereby lengthen the detector arrangement step by step as desired. It becomes clearly comprehensible from this that an odd number of outputs is also possible.

The number of resistances in FIG. 2c and FIG. 2d was not, incidentally, chosen randomly, but rather corresponds to one preferred, albeit not absolutely necessary, embodiment. Specifically, resistance networks having four resistances are available as SMT components; thus, in the case of discrete construction on a circuit board only one resistance network has to be mounted per four photodiodes added.

Figure 3:
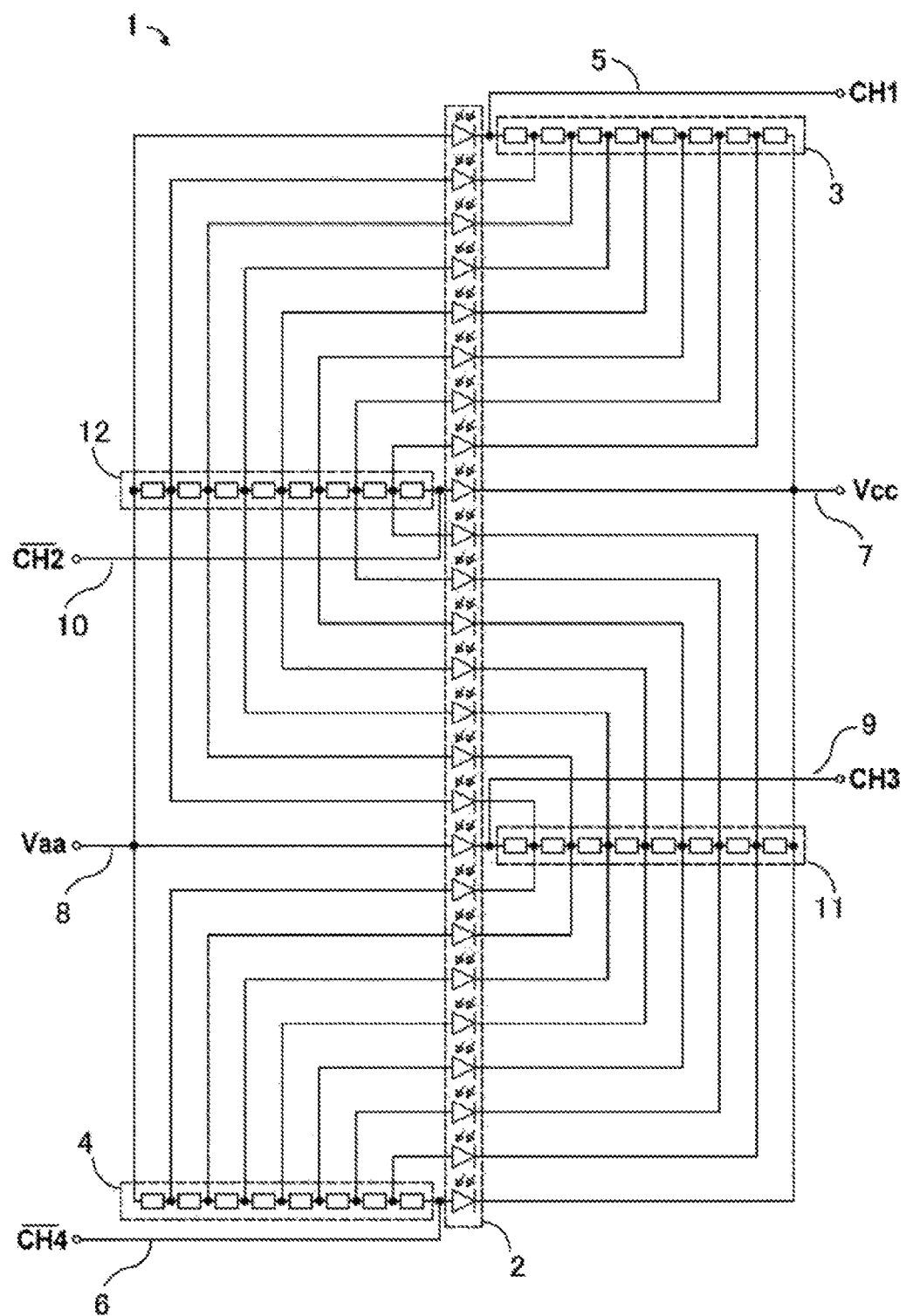
FIG. 3 illustrates a circuit of one particularly preferred detector arrangement according to the invention.

FIG. 3 shows a further possibility for scaling. FIG. 3 closely corresponds to FIG. 2d, even though the series of photodiodes has been depicted vertically rather than horizontally in FIG. 3 and the weighting networks according to FIG. 3 have more resistances than those according to FIG. 2d, with the result that the number of photodiodes connected to each weighting network in FIG. 3 is also more than in FIG. 2d.

The particularly preferred detector arrangement 1 shown in FIG. 3 thus contains a terminal for a positive bias voltage 7 and a terminal for a negative bias voltage 8. The detector arrangement has four outputs, which are shown at reference numerals 5, 10, 9, 6. The four weighting networks 3, 12, 11, 4 consist, then, of eight individual resistances, which are accommodated in one SMT component in one preferred structural embodiment. It is evident that for the physical wiring in the layout a maximum of ten signals have to run parallel in each case. However, this can be realized very easily with a multilayer circuit board and four layers, without the physical width of the sensor module being appreciably widened beyond the width of the photodiodes. A total of twenty five photodiodes 2 are used according to FIG. 3.

FIG. 4 then shows symbolically the detector arrangement with depicted incident light beam 13, the beam profile of which is indicated in the form of circles. FIG. 4 depicts the bias voltage source Vbias 14 for providing Vcc and Vaa and the output signals i1 to i4 pre-sent at the terminals 5, 10, 9, 6.

Furthermore, the beam position p and the linear length L of the detector arrangement and also the grid spacing of the photodiode d are shown.

The signals here are intended to be tapped off as output currents. The measured beam posi-tion $p_c$ can be determined from the values of $i_1$, $i_2$, $i_3$, $i_4$ with the aid of the following formula (i):

$$p_c = \frac{L}{2}\left(1 - \frac{3i_1 - i_2 - i_3 + 3i_4}{3(i_1 - i_2 + i_3 - i_4)}\right)$$

The diagram in FIG. 5b then shows the profile of the currents $i_1$, $i_2$, $i_3$, $i_4$ for an ideally thin beam having a vanishing diameter (diameter zero) and under the simplifying assumption that the gaps between the photodiodes are likewise zero.

In view of the fact that four current curves are depicted in one common graphical illustration for reasons of clear illustration, it should again be noted in order to avoid lack of clarity that $i_1$ is depicted as a thin line, falls from the maximum value in steps to zero and then remains constant at zero; $i_2$ is depicted with a thick line, falls from zero in steps to a mini-mum value, then rises in steps again to zero and then remains constant at zero; $i_3$ is depicted with a thick line, is firstly constant at zero, then rises from zero in steps to a maximum value and then falls from said maximum value in steps again to zero; $i_4$ is depicted with a thin line, is firstly constant at zero, and then falls from zero in steps to its minimum.

The stepped progression of the respective currents, i.e. the discretization as a result of the discrete photodiode surfaces, is clearly discernible.

The diagram in FIG. 5a shows the linearity error p-pc as a function of the real light beam position p. A linearity error of +−d/2 is manifested here. The linearity error fluctuates be-tween minima and maxima—specifically in a pronounced manner under the above assumptions (photodiode distance and beam diameter in each case zero).

For a real beam having a larger beam diameter, the curve profile is improved, as shown by the diagrams in FIGS. 6a and 6b. The diagrams in FIGS. 6a and 6b are both determined under the theoretical assumption that the gaps between the photodiodes are still—as in the case of FIG. 5—zero, but the beam profile now has a larger bell shaped profile corresponding to a real profile. FIGS. 5 and 6 have mutually comparable scales.

The diagram in FIG. 6b shows that, for the assumptions made in the profile of the currents $i_1$, $i_2$, $i_3$, $i_4$, the steps have clearly averaged out.

FIG. 6a clearly reveals that the linearity error is significantly improved as a result of the wide beam having the bell-shaped beam profile. Linearity errors are indeed still evident at the edge, these being caused by the beam profile being partly shaded at the edge. This effect is unavoidable, but can readily be compensated for by means of suitable calibration.

It is thus expedient, albeit not mandatory for the arrangement shown, to sufficiently enlarge an excessively small beam profile.

FIG. 7 shows an advantageous arrangement in this regard. The illustration shows how a light beam 13 impinges on a diffusing means 15 arranged above and somewhat at a distance from the light-sensitive regions of the photodiodes of the detector arrangement 1. With this arrangement, the diffusing means 15 arranged at a distance upstream of the detector arrangement 1 in the beam path of the light beam 13 can enlarge, i.e. expand, a small beam profile until incident on the photodiodes. Microlens arrays comprising cylindrical lenses are preferred as diffusing means; however, it is also possible to use other diffusing means. In this regard, a multiplicity of other transmissive diffusing films/windows are available.

By virtue of this measure, in practice even in the case of very thin beams a significant improvement in the linearity error is established, similar to—and in some instances even better than—the improvement between FIG. 5b and FIG. 6b.

FIG. 8 shows one particularly preferred complete laser beam receiver, such as is usable on construction sites and the like. Said laser beam receiver is shown in a front view and has the form of a manual receiver 20 having a display unit 21 for representing the measurement values as numerical value and as arrow representation, a keypad 22 for operation by the user, a loudspeaker 23 for acoustic signals and a diffusing means 15 fitted in the sensor window, and the detector arrangement 1 from FIG. 3 situated behind said diffusing means. A laser beam 13 sweeps over the diffusing means 15 fitted in the sensor window and the detector arrangement 1 from FIG. 3 situated behind said diffusing means in direction 16.

FIG. 9 illustrates a block diagram of said particularly preferred laser beam receiver 20 from FIG. 8, which comprises the position sensitive optoelectronic detector arrangement 1 from FIG. 3.

The reception of a laser beam 13 from a construction laser 50 functions as follows:

Firstly, the laser beam receiver is brought to the beam plane such that the laser beam impinges on the diffusing means 15, is expanded there and then passes to the detector arrangement 1.

Said detector arrangement 1 generates four signals 5, 10, 9, 6, which are conducted to an amplifier and signal conditioning unit 30, in which, in the electronic components 31 and 32, the signals are amplified, the DC offset is eliminated therefrom and the polarity is corrected, i.e. the amplifier stages of the electronic components 31 and 32 are embodied as either inverting 31 or non inverting 32.

The signals 33 generated in and by the electronic components 31 and 32 are forwarded to the evaluation unit 40. The latter contains four separate high speed A/D converters, which convert the electrical signals 33 into digital data streams. The fact that a single, multiplexed converter could be provided instead of the four separate high speed A/D converters depicted for the sake of clear illustration shall be mentioned for the sake of completeness.

The digital data streams are constantly stored in ring buffers 42 by an evaluation unit 41 until the evaluation unit 41 stops the storage, which is the case as soon as a trigger signal 47 signals to the driving unit 41 the fact that a detection threshold 48 has been exceeded, and as soon as a specific delay time after the trigger has also been allowed to elapse. The trigger signal 47 fed into the driving unit 41 is a digital trigger signal that is generated if an analog signal (TRG) exceeds a threshold. The analog signal (TRG) is in turn generated by summation of the conditioned analog signals 33. The digital trigger signal is thus ultimately generated whenever at least one of the photodiode currents is high enough.

The laser event in a similar manner to a digital storage oscilloscope is thus present in the memory of the evaluation unit, such that the microprocessor can computationally determine the digital equivalents of the signal amplitudes by peak integration, peak detection, RMS detection or the like and then in accordance with (i) can calculate a position measurement value that is corrected using calibration data from the memory 42 and then after the correction can be displayed as arrow representation or numerically via the display 21.

The amplifier stages 45 illustrated in FIG. 9 can usually be omitted or fixedly programmed at 1× amplification. However, nowadays the evaluation unit is implementable in practice as a microcontroller and, in the case of microcontrollers of routine design, said amplifier stages 45 are available virtually at no cost. If they can be programmed to a comparatively high amplification of e.g. 32×, even in a particularly simple version with somewhat poorer performance the entire amplifier and signal conditioning unit 30 can be omitted or bypassed or replaced by coupling capacitances.

Moreover, the triggering can in particular then be realized by digital comparators that are usually present in A/D converters.

Thus, the entire core of the detection circuit then consists only of the detector arrangement 1, a few passive components and a microcontroller 20.

It should be mentioned that the signal polarity need not necessarily be corrected at an analog level. Laser beam receivers that use a different number of signal channels 33 compared with the above example are furthermore conceivable. The number of signal channels 33 can thus be two or a greater multiplicity of signal channels 33 are provided.

While good results can already be achieved with the arrangement described above, the practical applicability of the arrangement can be improved further. In this respect, it should be noted that the arrangement generally serves for detecting rotating laser beams on construction sites and the like.

Said rotating laser beam will generally sweep over a horizontal plane. The position-sensitive light beam detectors which are used on construction sites and the like for receiving said beam and, for instance, for leveling a height typically have—as is evident from the text above—a plurality of photodiodes which in use are arranged in a series from top to bottom. The rotating laser beam then sweeps transversely across said series. This leads to a rather short signal duration required in accordance with the time for sweeping over even if the laser receiver held exactly perpendicularly is impinged on exactly perpendicularly by the beam, that is to say that for instance the entrance window is held exactly tangentially with respect to a circle around the laser beam rotation midpoint. If the laser beam receiver is not held exactly tangentially with respect to the circle around the laser beam rotation midpoint, the signal duration is shortened still further and, if appropriate, the signal additionally also becomes very weak because little light impinges on the photodiode.

Light beam reception at a wide horizontal aperture angle is therefore desirable additionally and/or intrinsically by itself, i.e. independently of how the photoelectric arrangement is exactly manifested and whether weighting networks and the like are provided in conjunction with individual photodiodes.

With the manual device or the like which comprises the actual position-sensitive light beam detector, beams are thus intended to be detectable at a wide aperture angle. If this is the case, this allows accurate measurements to be carried out in a simple manner even with a laser receiver not held exactly tangentially.

In the prior art, at most wide windows are arranged at a large distance from the photodiodes, wherein diffusing means can be used which widen received light beams, but at the same time greatly attenuate them. The light receivers are therefore bulky and insensitive. Receivers such as those according to US 2014/0203172 A1 shall be mentioned as an example of a light receiver according to the prior art.

It is desirable to provide handy, sensitive light receivers having a large aperture angle.

In a manner which—in our view at least with use of partially provided periods of grace in respect of novelty—is novel and intrinsically also by itself inventive, a remedy is provided here. This arrangement which is generally advantageous for position-sensitive light beam detectors need not necessarily be present at the above described light beam detectors which according to the invention make use of at least two weighting networks. Moreover, the arrangement described below can also be used with other light sensitive units for light beam reception, such as for construction laser receivers and the like, which themselves do not make use of two weighting networks in the manner according to the invention. The fact that the use at light detectors which, in accordance with the text above, according to the invention make use of at least two weighting networks is advantageous, however, shall be mentioned.

Consequently, what is also proposed in the present case is an independently intrinsically inventive light beam receiver comprising a housing, an elongated window therein, an elongated light guiding structure behind the window and light-sensitive regions, wherein the light-sensitive regions extend along the elongated window, specifically at a distance from the latter, and wherein the elongated light guiding structure is arranged between the elongated window and the light-sensitive regions and comprises a plurality of longitudinal side surfaces, wherein the longitudinal side surfaces of the elongated light guiding structure ex-tend between the elongated window and the light-sensitive regions, and also along the light-sensitive regions, and the longitudinal side surfaces are configured to reflect light entering the light guiding structure from the window into the light-sensitive regions.

The light-sensitive regions can be situated directly opposite the window, such that a light beam incident on the window perpendicularly passes without reflection at the longitudinal side surfaces of the light guiding structure directly onto the light-sensitive regions. In such a case, the light-sensitive regions can lie in a plane parallel to the plane of the window. Alternatively and/or additionally, it is possible to arrange the light-sensitive regions differently, for instance in a plane perpendicular to the window plane. The light guiding structure can then be fashioned such that a beam incident on the window perpendicularly is guided onto the light-sensitive regions. For this purpose, at that part of the light guiding structure which faces away from the window and faces the light-sensitive regions, provision can be made of a mirror situated at an angle of 45°, or a side surface formed at an angle of 45°, at which total internal reflection takes place.

As shown by the explanations above—at least in the case of light-sensitive regions which lie in a plane parallel to the plane of the window—only the light beams which do not impinge sufficiently perpendicularly on the window, but rather at an excessively oblique angle, are guided onto the light-sensitive regions by reflection at the longitudinal side surfaces of the light guiding structure. In this case, a light beam can be reflected both singularly and multiply at the longitudinal side surfaces of the light guiding structure.

The fact that the light-sensitive regions can be photodiodes, which, as disclosed above in accordance with the above other and independently advantageous inventive aspect of this application, can be arranged between weighting networks, shall be mentioned.

The light beam receiver which is intrinsically advantageous to the further aspect can be formed with a light guiding structure, wherein the regions of the longitudinal side surfaces that extend along between the elongated window and the light-sensitive regions are formed as mirror surfaces. This allows an embodiment which is especially not very massive and is thus of low weight.

Alternatively and/or additionally, the light beam receiver which is intrinsically advantageous according to the further aspect can be formed such that the light guiding structure is formed as a prismatic body and total internal reflection of the light guided within the light guiding structure occurs at the longitudinal side surfaces between the elongated window and the light-sensitive regions. In this case, the prismatic body will be formed from a material sufficiently transparent to the wavelength to be detected, such as e.g. plastic.

Typically, in the case of a light beam receiver and the described light guiding structure for expanding a beam, provision will be made of a diffusing arrangement upstream of the entrance into the light guiding structure. If light is then expanded in order to impinge on a plurality of the photodiodes which form the light-sensitive regions, and in this case where possible expansion is effected not only in a longitudinal direction but also transversely, the light expanded in the transverse direction is not lost for detection, but rather, by virtue of the reflective longitudinal side surfaces, will indeed still pass into the photodiodes or onto the differently configured light-sensitive regions. The sensitivity is thus increased despite the use of diffusing means. Moreover, light incident on the window at a shallower angle will still be able to pass to the light-sensitive regions despite a structurally small embodiment of the light receiver.

The arrangement that is able to be separately claimed independently is described with reference to FIG. 10 as follows.

Reference signs which in part have already been allocated in other figures are used in the individual parts of FIG. 10; therefore, hereinafter when reference is made in the text to those reference signs that are used in FIG. 10, the respective reference numeral is preceded by the digits "10-". Thus, 10-1 shows a position sensitive optoelectronic detector arrangement; 10-2 photodiodes; 10-13 light beams; 10-15 diffusing means: microlens array, lenticular film, holographic diffuser, etc.; 10-70 a housing part, specifically a detail of the transparent upper housing shell is illustrated for a real product; 10-71 a prism or a prismatic light guiding structure, and 10-72 the aperture angle, and 10-73 a decorative film that defines the outwardly visible sensor window.

The light guiding structure formed with reflective interfaces is of particular importance, by means of which structure light is guided from the entrance window to the optoelectronic elements such as the series of photodiodes. By virtue of this prismatic light guiding structure, light is detected at a wide aperture angle and is guided to a sufficient extent even in the case of oblique incidence onto the optoelectronic element. The arrangement with an additional prism as shown in FIG. 10c allows narrower sensor windows of e.g. 5 mm in conjunction with an aperture angle which is nevertheless larger than the aperture angle achieved in the prior art. It should moreover be pointed out that said prism is not used for spectral decomposition, but rather for guiding light.

What is thus also proposed inter alia, is a position-sensitive light beam detector comprising photodiodes for light beam reception, wherein the photodiodes are assigned a beam detection enhancement means for enhancing the beam detection, which is preferably arranged such that it expands the light spot incident on the photodiodes with a given light beam diameter for simultaneous reception by at least two, preferably more, adjacent photodiodes.

In this case, it is preferred for the beam detection enhancement means to comprise at least one from lenticular film, microlens array, holographic diffuser or the like at the housing top side and subsequently a light guiding structure leading deeper into the housing interior and serving for guiding the expanded light beam down to the photodiodes into the interior of the housing.

In this case, said light guiding structure leads in a direction away from the top side of the housing, said top side having the entrance window, and toward the underside of the housing.

The light guiding structure presented here thus differs significantly from the previously known optical waveguide that was proposed earlier by the applicant or the inventor and that is intended to guide light, which is received centrally on a rod or the like serving as an optical waveguide, simultaneously to both end sides thereof, where said light is then to be detected by photodiodes. In the present case, light that has been diffused into a sidewall is not guided over long paths in a transverse direction to opposite end sides, rather light is (possibly) guided into a first end side of an optical waveguide by means of a greatly deflecting structure such as a lenticular film and is radiated onto an optoelectronic element such as a photodiode on the opposite end side. This affords advantages in the detected aperture angle without increasing the window width or the receiver thickness.

It is possible for the position-sensitive light beam detector to comprise a diffusing film arranged upstream of the light guiding structure.

A description has thus been given above of, inter alia, but not exclusively, a position sensitive optoelectronic detector arrangement for the spatial resolution of light beam reception consisting of at least one spatially substantially linear arrangement of a multiplicity of photodiodes, at least two electrical weighting networks which are connected thereto and which are configured for electrical weighting of the signals of individual photodiodes in accordance with their position on the detector arrangement, and at least two output signals of the detector arrangement, wherein it is provided that each weighting network is connected to exactly one of the output signals and that the output signals that are adjacent in accordance with spatial weighting, upon light beam reception of the photodiodes jointly assigned thereto, have signal polarities respectively opposite to one another.

Furthermore, a description has also been given of, inter alia, a detector arrangement, where-in it is furthermore provided that for the plurality of photodiodes both the cathode currents thereof and the anode currents thereof are used for the spatial weighting in different weighting networks.

Furthermore, a description has also been given of a detector arrangement, wherein it is furthermore provided that at least at two of the weighting networks either only cathodes or anodes of the photodiodes assigned thereto are connected thereto.

Furthermore, a description has also been given of, inter alia, a detector arrangement, where-in it is furthermore provided that the weighting networks consist of a chain of either electrical resistances, inductances or resonant circuits.

Furthermore, a description has also been given of, inter alia, a detector arrangement, where-in it is furthermore provided that in the case of at least one weighting network respectively either two anodes or two cathodes of photodiodes are connected to the internal nodes of the chain.

Furthermore, a description has also been given of, inter alia, a detector arrangement, where-in it is furthermore provided that an output signal of the detector arrangement is tapped off at a first end of the chain, and that a bias voltage is connected to a second end of the chain.

Furthermore, a description has also been given of, inter alia, a detector arrangement, where-in it is furthermore provided that said detector arrangement is integrated into a laser beam receiver.

Furthermore, a description has also been given of, inter alia, a detector arrangement, where-in it is furthermore provided that the laser beam receiver is configured for the spatially re-solving reception of a rotating laser beam sweeping over a plane.

What is claimed is:
1. A position-sensitive light beam detector comprising photodiodes and
at least two weighting networks,
  each weighting network comprising
    a signal output
    and
    network nodes, wherein
a plurality of the network nodes of the first weighting network are provided for the photodiode terminal in such a way
that
each node of said plurality of nodes is connected
to one of the nodes
of the second weighting network
via a photodiode.

2. The position-sensitive light beam detector as claimed in claim 1,
wherein
only cathodes of the photodiodes
are connected
to the nodes
for the photodiode terminal
of the first weighting network,
and
only anodes of the photodiodes
are connected
to the nodes
for the photodiode terminal
of the second weighting network.

3. The position-sensitive light beam detector as claimed in claim 1, wherein
at least one of the weighting networks is formed as a chain,
wherein
the signal output is arranged
at one end of the chain
and
a bias voltage is connected
to the other end of the chain.

4. The position-sensitive light beam detector as claimed in claim 3, wherein the at least one, preferably a plurality, more particularly preferably all, of the weighting networks are formed
as a chain of electrical resistances
or
as a chain of inductances
or
as a chain of resonant circuits.

5. The position-sensitive light beam detector as claimed in claim 4, wherein the nodes for the photodiode terminal are arranged between the resistances, inductances or resonant circuits of the chain.

6. The position-sensitive light beam detector as claimed in claim 5, wherein one or a plurality of weighting networks are embodied as a chain of electrical resistances, wherein the resistances in a chain have the same setpoint resistance values.

7. The position-sensitive light beam detector as claimed in claim 1,
wherein the at least two weighting networks are each
embodied as a chain,
wherein
the signal output is arranged
at one end of each chain
and
a bias voltage is connected
to the other end of each chain,
and wherein different bias voltages (Vaa, Vcc) are
connected to the first and second weighting network.

8. The position-sensitive light beam detector as claimed in claim 7, wherein
it is embodied such that
upon light beam reception
on at least one photoelectric element arranged
between a first and a second weighting network,
in particular on at least one photodiode,
a first signal polarity is present at the signal output of
the first weighting network,
said first signal polarity being opposite to that at the
signal output of the second weighting network.

9. The position-sensitive light beam detector as claimed in claim 6, wherein
provision is made of a series of photodiodes alongside one another,
the weighting networks are embodied as chains
and
the photodiodes arranged in a series
are connected to nodes of the weighting network that succeed one another in the chain.

10. The position-sensitive light beam detector as in claim 9, wherein the photodiodes are assigned a beam detection enhancement means for enhancing the beam detection, which is preferably arranged such that it expands the light spot incident on the photodiodes with a given light beam diameter for simultaneous reception by at least two, preferably more, adjacent photodiodes.

11. The position-sensitive light beam detector as claimed in claim 1, wherein the photodiodes are assigned a beam detection enhancement means for enhancing the beam detection, which is preferably arranged such that it expands the light spot incident on the photodiodes with a given light beam diameter for simultaneous reception by at least two, preferably more, adjacent photodiodes and the beam detection enhancement means comprises at least one diffusing film at the housing top side and a light guiding structure for guiding the expanded light beam down to the photodiodes into the interior of the housing.

12. The position-sensitive light beam detector as claimed in claim 11, wherein the beam detection enhancement means comprises a lenticular film.

13. The position-sensitive light beam detector as claimed in claim 1, wherein
at least one third weighting network is provided,
wherein at least the second of the at least three weighting
networks is formed as a chain having internal nodes
different than the signal output and a supply voltage
input,
wherein
at least one of said internal nodes of the chain
either the anodes
or the cathodes
of two different photodiodes are connected,
wherein the other pole of the first of said photodiodes is
connected to a node of the first weighting network; and
wherein the other pole of the second of said photodiodes
is connected to a node of the third weighting network.

14. A method for receiving a rotating laser beam sweeping over a plane, wherein
the rotating laser beam sweeping over a plane is received
with a position-sensitive light beam detector
comprising a plurality of photodiodes and at least two
weighting networks, each weighting network comprising a signal output and network nodes, with a
plurality of the network nodes of a first weighting
network of the at least two weighting networks being
connected such that each node of said plurality of
nodes is connected to one of the nodes of the second
weighting network of the at least two weighting
networks via a photodiode;

and
the simultaneously obtained cathode currents and anode currents of the photodiodes connected to the different weighting networks are evaluated in order to determine the position of beam reception.

15. A light beam receiver according to claim 1,
further comprising
a housing,
an elongated window therein,
an elongated light guiding structure behind the window
wherein
the photodiodes have light-sensitive regions extend
along the elongated window,
but
at a distance from the elongated window,
wherein the elongated light guiding structure
is arranged
between the elongated window
and the light-sensitive regions
and
comprises a plurality of longitudinal side surfaces,
wherein
the longitudinal side surfaces of the elongated light guiding structure extend
between the elongated window
and
the light-sensitive regions,
specifically
along the light-sensitive regions,
and the longitudinal side surfaces are configured to reflect light entering
the light guiding structure
from the window
into the light-sensitive regions arranged along the window but at a distance therefrom.

16. The light beam receiver as claimed in claim 15, wherein the regions of the longitudinal side surfaces that extend between the elongated window and the light-sensitive regions are formed as mirror surfaces.

17. The light beam receiver as claimed in claim 15, wherein the light guiding structure is formed as a prismatic body and total internal reflection of the light guided within the light guiding structure occurs at the longitudinal side surfaces between the elongated window and the light-sensitive regions.

18. The light beam receiver as claimed in claim 15, wherein, for expanding a beam, provision is made of a diffusing arrangement upstream of the entrance into the light guiding structure.

19. The position-sensitive light beam detector as claimed in claim 1, wherein
provision is made of a series of photodiodes alongside one another,
the weighting networks are embodied as chains
and
the photodiodes arranged in a series
are connected to nodes of the weighting network that succeed one another in the chain.

20. The position-sensitive light beam detector as in claim 19, wherein the photodiodes are assigned a beam detection enhancement means for enhancing the beam detection, which is preferably arranged such that it expands the light spot incident on the photodiodes with a given light beam diameter for simultaneous reception by at least two, preferably more, adjacent photodiodes.

* * * * *